United States Patent Office

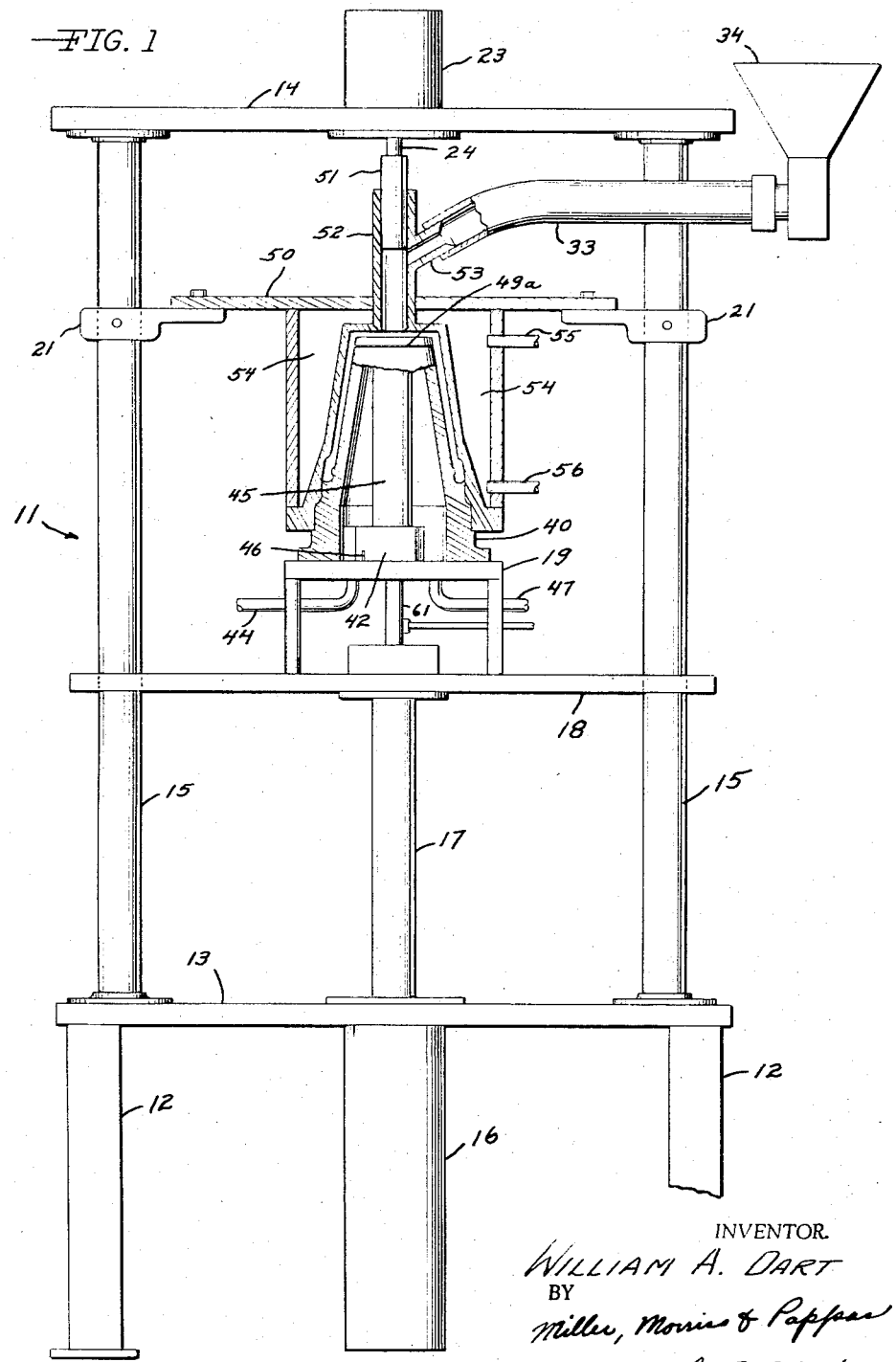

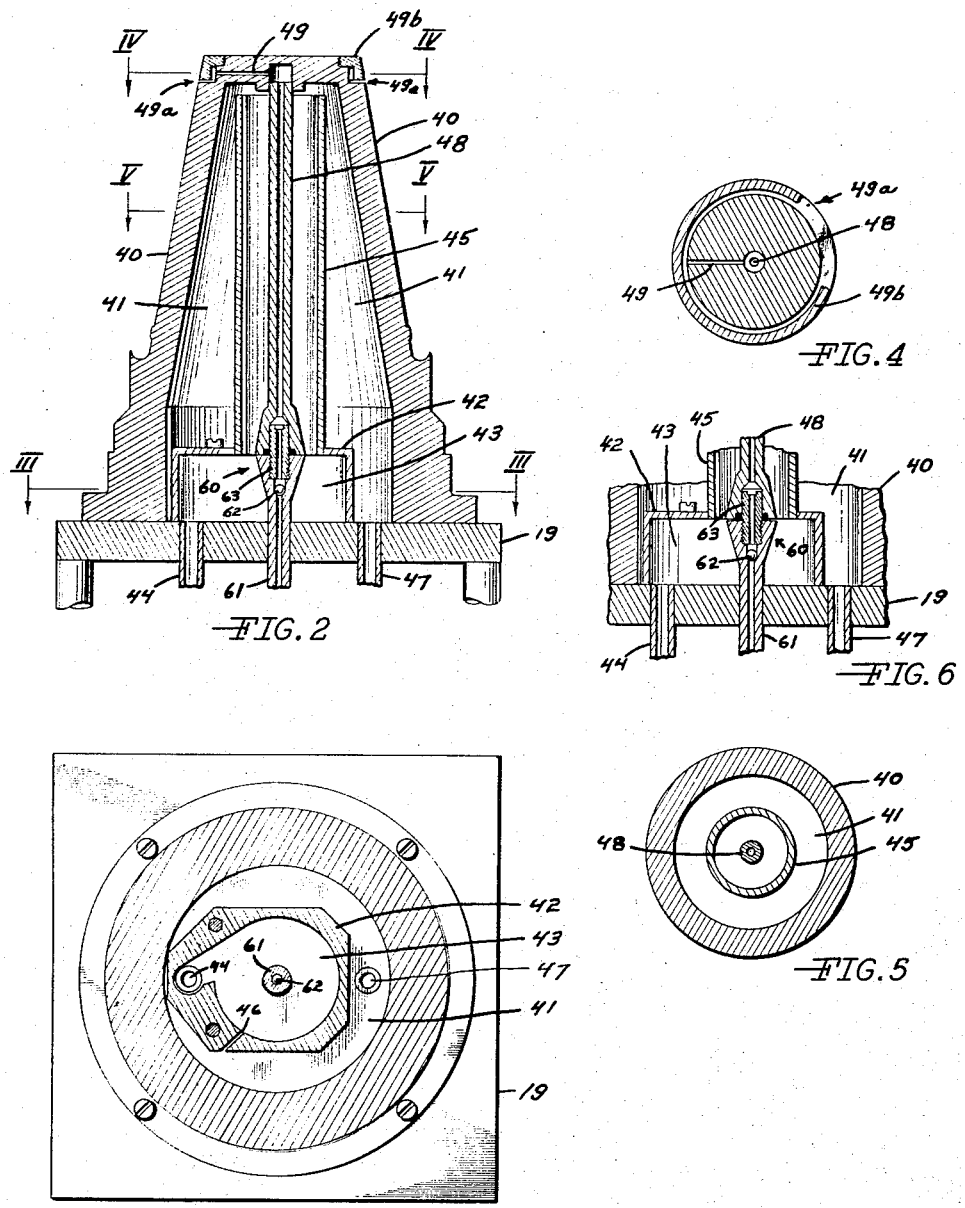

3,355,530
Patented Nov. 28, 1967

3,355,530
METHOD FOR FORMING FOAMED PLASTIC ARTICLE
William A. Dart, Mason, Mich., assignor to Dart Manufacturing Company, Mason, Mich., a partnership of Michigan
Original application Jan. 20, 1964, Ser. No. 338,686. Divided and this application Mar. 4, 1966, Ser. No. 549,081
5 Claims. (Cl. 264—51)

ABSTRACT OF THE DISCLOSURE

A method for forming a plastic article whereby steam used to foamably expand the resin beads is dried within the mold assembly immediately prior to passage of the steam into the mold cavity and which consists of the following steps: (1) a mold cavity is filled with expandible resin beads, (2) steam has excess moisture removed therefrom by passage through a condensate collecting chamber provided in the mold assembly, (3) the dry steam is then introduced directly into the mold cavity so as to foamably expand the resin beads to form the plastic article, and (4) drying the steam passageway in the mold assembly by use of compressed air while utilizing such compressed air to eject the plastic article from the mold.

The present application is a division of application Ser. No. 338,686, filed Jan. 20, 1964, which is a continuation-in-part of my presently co-pending application Ser. No. 855,561, filed on Nov. 27, 1959 and entitled, Method and Apparatus for Forming Thin Wall Cellular Plastic Containers, and now Patetnt No. 3,178,491.

This invention relates to a method for forming plastic articles from resin beads and more particularly to a method whereby excess moisture is removed from the steam utilized to expand the resin beads prior to the entry of the steam into the steam chest and mold cavity. The invention further relates to the use of an apparatus for forming plastic articles whereby the amount of moisture present in the mold cavity during the molding operation is decreased by use of a mold assembly having a single channel system which is alternately utilized to conduct steam into the mold cavity for foamably expanding resin beads contained therein and to conduct air into the same mold cavity so as to effect ejection of the finished container after the molding operation has been completed. This alternate use of the channel system by steam and air results in a continual drying of the channel system so as to virtually eliminate the presence of condensate therein.

The invention described herein generally has application to the formation of plastic articles of any size and configuration. While this particular embodiment of the invention relates to the formation of a thin wall cellular plastic container, the invention should not be limited to the formation of that specific product.

In the devices of the prior art, it is standard procedure to introduce live steam directly into the mold cavity for the purpose of molding the expandible polystyrene beads that have been introduced therein. The usual practice is to admit the steam into the steam chest or jacket in the body of the mold surrounding the mold cavity. The steam passes from the steam chest or jacket into the mold cavity through communicating openings provided therebetween.

When the live steam is thus introduced directly into the mold and mold cavity, a condensate is produced which adversely affects the fusion of the bead. Therefore, it has been necessary to preheat the mold before filling it with the expandible polystyrene beads and to train the moisture out of the cavity before the mold is filled with beads. Thereafter, the cavity is filled with the beads and the steam is again introduced into the mold and mold cavity. This results in a slower production cycle of the mold apparatus.

The problem of steam condensate being formed is particularly critical in the molding of thin walled products such as thin wall plastic containers. Not only is a defective product formed due to the presence of excess moisture in the steam introduced directly into the mold cavity, but the collection of condensate in the mold cavity and channel system during repeated molding operations also contributes to the formation of a defective product.

A need has therefore existed for an apparatus which removes the moisture from the steam prior to the introduction of the steam into the steam chest, channel system, and mold cavity.

A further need has arisen for a mold element whereby the steam utilized to foamably expand the polystyrene resin beads is conducted into the mold cavity by use of the same channel system which is utilized by the air which ejects the completed container from the mold core element.

It is therefore an object of this invention to provide and use a mold core element which is provided with a condensate collecting chamber capable of removing moisture from the steam prior to the entry of the steam into the mold cavity.

Another object of this invention is to provide and use a valve control means in association with a mold element whereby the channel system provided therein can be cyclically utilized to introduce steam into the mold cavity so as to foamably expand the beads contained in the mold cavity and to introduce compressed air into the same cavity so as to eject the finished container.

Yet another object of this invention is to provide and use a mold core element having a single channel system which is alternately used to convey steam to the mold cavity for foaming purposes and air to the mold cavity for ejection purposes, such alternate use of steam and air drying out any condensate which is formed.

Other objects and advantages found in the construction of my invention will be apparent from a consideration of the following specification in connection with the appended claims and the accompanying drawings.

In the drawings:

FIGURE 1 is a side elevation section view of the entire mold press apparatus and shows in detail the basic overall operation of the mold assembly.

FIGURE 2 is a side elevation section view of the mold core element and shows in detail the channel system, the steam condensate removing chamber and the valve means permitting alternate cyclical use of the channel system by steam for foaming purposes and by air for ejection purposes.

FIGURE 3 is a sectional view taken on line III—III of FIGURE 2 and shows in detail the condensate collecting chamber provided in the core mold element.

FIGURE 4 is a cross sectional view of the core element taken on line IV—IV of FIGURE 2 and shows in detail the portion of the channel system located in the upper portion of the mold core element and which alternately conducts air and steam into the mold cavity.

FIGURE 5 is a cross sectional view taken on line V—V of FIGURE 2 and shows in detail the relative positioning of the outer wall of the core element, of the upper tubular extension of the condensate chamber and of the steam and air channel member extending upwardly therethrough.

FIGURE 6 is a side elevation partial section view showing the valve means in its open position so as to permit steam from the condensate chamber to pass into the centrally positioned upwardly extending channel member.

*General description*

In general, a method and apparatus is provided for forming thin wall plastic containers from foamable resin material. The method and apparatus of the instant invention incorporates the use of a condensate collecting chamber in association with the mold assembly so that steam is relatively "dry" prior to its entry into the mold cavity. Further, a central valve means and channel system is incorporated into the mold core element so that steam and air, respectively, may be alternately conducted through the core element into the mold cavity.

When the central valve is actuated to its closed position, the channel system selectively conveys air to the mold cavity so as to automatically eject the finished end product container. The passage of air through the channel system acts to dry any condensate remaining therein from steam previously conveyed therethrough during the molding operation. The cyclical alternating use of the same channel system by steam and air eliminates the need for a separate drying step to remove condensate. Such a drying step would be necessary if a separate line was used solely for the introduction of steam into the mold cavity.

The provision of the condensate chamber, coupled with the dual purpose channel system, virtually eliminates the introduction of condensate into the mold cavity and also results in a faster production cycle of molded containers. The mold apparatus, thus improved, results in a more uniform expansion of the polystyrene beads into a satisfactory final end product. While the apparatus and method described herein deals specifically with the formation of thin wall containers, it is within the concept of this invention to similarly utilize a condensate chamber and dual purpose channel system in an apparatus and method for forming any type of plastic article by the expansion of resin beads.

As shown generally in the drawings, a mold press frame is provided which supports male and female mold elements which close to form a mold cavity. Actuating means are provided to selectively move the mold core element into mating engagement with the fixed female mold element so as to define the mold cavity. Resin bead hopper loading means are provided on the frame and are capable of delivering measured amounts of polystyrene beads into the mold cavity by use of an air delivery tube. A closure plug is provided in association with the female mold element so as to effect closure of the mold cavity after the resin beads have been loaded into the mold cavity.

In the preferred embodiment of the invention, the female portion of the mold assembly is provided with a steam chest or jacket into which steam from a steam source (not shown) may be introduced to effect the foamable expansion of the resin beads within the mold cavity.

Simultaneously, steam is introduced into the condensate chamber and passes therethrough into the steam chest of the mold core element. Actuating means (not shown) have also opened the central valve so as to permit the steam to simultaneously flow from the condensate chamber through the channel system into the mold cavity, thus further enhancing the foaming of the resin beads contained therein.

A coolant, such as cold water, is then cyclically introduced into the steam chest or jacket of the mold assembly from a coolant source (not shown) so as to cool the mold after the expansion of the beads has occurred.

Upon completion of the molding of the thin wall container, the mold assembly is opened by lowering the core element so as to permit removal of the final end product container. The thin wall container is ejected by introducing compressed air through the channel system provided in the mold core element. The air passes through the channel system provided in the core element to act against the internal portion of the thin wall container. This forces the container from the core element and thus removes the completed container from the mold apparatus.

A commercially available steam pre-expander is used to pre-expand the expandible polystyrene beads to any desired size in accordance with plastic molding procedures well known in the art and is not shown in the drawings. As the description becomes more specific, it will be seen that the entire operation is automatically sequenced and that the apparatus lends itself to high speed automatic production of thin wall plastic containers.

*Specific description*

As shown in FIGURE 1, a mold press apparatus is provided for the manufacture of thin wall containers. The frame 11 consists of machine supports 12, lower actuator cross support 13, and upper actuator cross support 14 and vertical platen guides 15. A lower air cylinder actuator member 16 having an upwardly extending actuator rod 17 is provided on the lower actuator cross support 13. The upwardly extending actuator rod 17 is connected to and selectively moves the lower platen 18. The lower platen 18 engages the platen guides 15 and is slidable therealong. The mold core element support frame 19 extends upwardly from the lower platen 18 so as to support the tapered mold core element 40 in its use position. Female mold supports 21 are provided on the platen guides 15 and may be adjusted to any desired fixed position therealong. The female mold supports 21 engage the tapered female mold element assembly 50 and retains it in its fixed use position. The female mold assembly 50 slidably receives the mold core element 40 so as to form the mold cavity.

An upper air cylinder actuator member 23 having a downwardly extending actuating rod 24 is provided on the upper actuator cross support 14. The downwardly extending actuator rod 24 is connected to and selectively moves a closure plug member 51. The closure plug member 51 is provided so as to effect closure of the mold cavity after it has been loaded with polystyrene beads. The female mold element assembly 50 is provided with an axially positioned upwardly extending hollow stem 52 which communicates with the mold cavity. The hollow stem 52 is adapted to slidably receive the closure plug member 51 therein. An intake extension tube 53 is transversely provided on said upwardly extending stem 52 so as to engage a material pressure feed line 33 through which pre-expanded polystyrene beads are loaded into the mold cavity. The feedline 33 delivers pre-determined amounts of beads from a suitable dispensing supply hopper 34 to fill the mold cavity. Suitable air pressure delivery means are incorporated into the supply hopper dispensing apparatus so as to permit automatic selective delivery of beads to the mold cavity. The resin beads are thus blown into the mold cavity. In the load and mold position there is sufficient clearance between the base of the core element 40 and the lower internal portion of the female mold element so as to permit the passage of air downwardly therebetween out of the mold cavity, thus facilitating the loading operation. This in no way hinders the subsequent molding of the plastic article.

The female mold element assembly 50 is provided with a heat exchange jacket or cavity 54 to allow selective heating and cooling of the mold cavity so as to foamably expand the resin beads contained therein. A suitable intake line 55 and return drain line 56 are provided to connect the jacket 54 with steam and coolant sources (not shown) so as to effect the foregoing selective heating and cooling. It is within the scope of this invention to provide any other type of suitable heating and cooling means, if desired, instead of the steam and cold water utilized in the preferred embodiment of the invention.

As shown generally in the drawings and more specifically in FIGURE 2, the tapered mold core element 40 is provided with a steam chest cavity 41. A housing 42 is provided having a steam condensate removing chamber 43 for "drying" of steam introduced therein. A steam inlet line 44 is provided in a peripheral offset portion of the chamber 43 so that a swirling motion is imparted to steam introduced into the condensate removing chamber 43, thus utilizing centrifugal force to aid in removing moisture from the steam. An open end elongate tubular extension 45 is provided at the top of the housing 42 and communicates with the condensate chamber 43 so as to permit the steam to pass upwardly therethrough from the condensate chamber 43 into the steam chest cavity 41. A slot 46 is provided through the bottom of the wall of the housing 42 so as to permit collected condensate to drain from the chamber 43 into the bottom of the steam chest cavity 41 and out through the return drain line 47.

An axially positioned vertically oriented tubular channel member 48 is provided in the core element 40 so as to extend upwardly therethrough to contact the upper portion thereof. As shown in FIGURES 2 and 4, a transverse horizontally oriented channel bore 49 is provided through the upper wall of the core element 40. The channel bore 49 is in communication with the tubular channel member 48 and extends outwardly to communicate with an external annular groove 49a provided around the upper portion of the core element 40. The groove 49a is formed by a ring 49b which is screwed to the upper end of the core element 40 as shown in FIGURES 2 and 4. Thus formed, the annular groove 49a is in open communication with the mold cavity.

A valve assembly 60 is provided at the base of the channel member 48 which serves to operatively connect the channel member 48 to inlet air delivery member 61.

The inlet air delivery member 61 is slidably movable in a vertical manner by suitable actuating means (not shown) so as to selectively move into and out of contact with the bottom surface of the channel member 48. When the inlet air delivery member 61 is in its closed sealed abutting contact with the channel member 48, it selectively delivers air therethrough from a compressed air source (not shown). Thus, compressed air is delivered from the compressed air source, through the inlet air delivery member 61, through the channel member 48, through the transverse channel bore 49 to the annular groove 49a.

After the end product container has been formed, the core element 40 is lowered and the compressed air is energized by sequencing means not shown. The compressed air acts along the annular groove 49a upon the inside of the finished container so as to eject the finished container from the core element 40. The principle of air ejection from molds is well known in the art and therefore other configurations of the air channel system can be designed as desired.

Prior to the molding step, the inlet air delivery member 61 is actuated downwardly so as to separate slightly from the bottom surface of the channel member 48 as shown in FIGURE 6.

A ball check member 62 is provided in the upper portion of the inlet air delivery member 61 so as to seal the inlet air delivery member 61 when steam is being introduced into the channel member 48. The ball check member 62 is retained by a retainer plug 63 having a bore therethrough and which is screwed into the top of inlet air delivery member 61. Thus, steam cannot pass downwardly into the inlet air delivery means during the foaming process. It should be noted that there is sufficient clearance between the outer diameter of the retainer plug 63 and the internal wall of the channel member 48 into which it extends so as to permit the passage of steam upwardly therebetween from the condensate chamber 43 and into the channel member 48. Thus, during the mold step, steam is permitted to pass from the condensate removing chamber 43 into the channel member 48 and upwardly therethrough into the transverse bore 49. The steam then passes through the transverse bore 49, through the annular groove 49a and into the mold cavity. The "dry" steam thus comes into direct contact with the resin beads in the mold cavity so as to enhance the foamable expansion thereof to form the end product thin wall container.

It is thus seen that steam and air alternately use the same channel delivery system to reach the mold cavity. This alternate use of steam and air further enhances the "drying" of the channel system and mold cavity so as to cooperate with the condensate chamber in order to decrease the amount of moisture reaching the mold cavity. Such condensate has heretofore resulted in inferior end products due to improper foaming action brought on by the presence of moisture condensate in the lines and mold cavity during the foaming operation.

It should be specifically pointed out that in the foaming process, steam not only passes into the channel member 48 but also travels upwardly from the condensate chamber 43 through the elongate tubular extension 45 and into the steam chest jacket or cavity 41 of the mold core element 40. Thus, steam from the condensate chamber not only passes through the channel system into the mold cavity, but also passes into the core element steam chest cavity 41 so as to simultaneously heat the walls of the mold core element, and hence the mold cavity.

While the preferred embodiment of the invention provides the condensate chamber at the base of the core element, it is within the the scope of the invention to locate the condensate chamber at any position in the mold assembly provided that it is positioned after the steam source and ahead of the channel delivery system and the mold cavity.

*Operation*

The preferred embodiment of the thin wall container is formed from raw expandable polystyrene beads or granules which are commercially available. Although the preferred embodiment of the invention makes specific utilization of expandable polystyrene beads or granules, it is considered to be within the scope of the invention to utilize any of the other types of foamable resin materials that are commercially available.

In operation, the resin beads are pre-expanded to any desired size in accordance with the particular application. For instance, pre-expansion of the beads to a density of four to five pounds per cubic foot requires a wall thickness of about one-tenth of an inch if a double layer of beads is to be obtained. A double layer is preferable because it is less likely to produce rejected pieces by insuring leak-proof construction. The density of the pre-expanded beads can be controlled by regulating the feed rates of bead and steam to the pre-expander. This is accomplished in accordance with the methods and procedures well known in the art.

In operation, the mold core element 40 is moved into a mating load and mold relationship with the female mold element 50. A predetermined amount of resin beads are introduced into the mold cavity from the hopper 34. After the mold cavity has been loaded with the resin beads, the closure plug member 51 is actuated to move downwardly within the stem 52 so as to close the mold cavity. In this position, the lower end surface of the closure plug 51 cooperates with the rest of the mold assembly to form a thin wall container having a flat bottom surface.

Steam is then introduced into the steam chest or jacket 54 of the female mold element 50 and into the condensate chamber 43 of the mold core element 40. The steam is "dried" in the condensate chamber 43 by removing moisture therefrom as previously described herein.

The inlet air delivery member 61 is moved downwardly (by means not shown) so as to separate slightly from the channel member 48 as shown in FIGURE 6. This permits "dried" steam from the condensate chamber 43 to pass upwardly into and through the channel member 48 and subsequently into the mold cavity so as to assist in foamably expanding the resin beads contained therein. The "dried" steam also moves upwardly through the tubular stem extension 45 into the steam chest cavity 41 of the mold core element 40. The resin beads are thus foamably expanded so as to form the thin wall plastic container.

By use of suitable sequencing means (not shown), the steam is shut off. The inlet air delivery member 61 is moved upwardly into sealing contact with the bottom surface of the channel member 48. A coolant (cold water in the preferred embodiment) is then passed into the steam chest cavities of the mold assembly so as to cool the entire mold apparatus assembly. The mold core element 40 is then lowered by actuating means 16 so as to be fully withdrawn from the female mold element 50. Again by the use of sequencing (not shown), compressed air is introduced into the inlet air delivery member 61 which is positioned as shown in FIGURE 2. The air passes from the inlet air delivery member 61 by unseating the ball check member 62. The air then moves upwardly through the retainer plug 63 into the channel member 48. The air passes upwardly through the channel member 48 and then into the transverse channel bore 49. The air moves outwardly through the channel bore 49 and then into the external annular groove 49a provided around the upper portion of the core element 40. In this manner, the compressed air acts against the inside of the end product thin wall container so as to eject it from the mold core member.

After the finished container has been ejected, the mold apparatus is returned to its load and mold position and the cycle is repeated as described above. The sequencing means which are utilized to properly regulate the various steps in the molding steps described above are not shown in the drawings but are means that are well known in the art and are not described herein.

Although the actuating means of the preferred embodiment of the invention consists of compressed air cylinders, it is within the scope of the invention to utilize electrically operated servo-mechanisms or any other type of suitable actuating means known in the art.

It is thus seen that a unique type of mold press apparatus is provided which incorporates a condensate chamber therein to remove moisture from steam before it enters the mold cavity. This results in a more satisfactory end product thin wall container because of the more uniform foaming which occurs due to the "dryness" of the steam entering the mold cavity.

Further, the provision of the same channel system alternately to convey steam to the mold cavity and to convey air to eject the finished container results in further drying so as to reduce the amount of moisture or condensate within the mold cavity during the molding operation.

Although a mold press apparatus having a specific configuration has been described herein, it is within the scope of this invention to vary the design of the mold press in any manner known in the art as long as the invention described herein is utilized to result in "drier" steam entering the mold cavity.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

1. In a method for forming a plastic article, the steps which include:
   (a) filling a mold cavity with expandable resin beads;
   (b) removing excess moisture from steam to be utilized in foamably expanding said resin beads by passage of the steam through a condensate collecting chamber located within the mold assembly; and
   (c) introducing said steam from said chamber directly through a channel system into said mold cavity so as to foamably expand said resin beads to form a plastic article.

2. In a method for forming a plastic article, the steps which include:
   (a) filling a mold cavity with expandable resin beads;
   (b) removing excess moisture from steam to be utilized in foamably expanding said resin beads by passage of the steam through a condensate collecting chamber located within the mold assembly;
   (c) introducing said steam from said chamber directly through a channel system into said mold cavity so as to foamably expand said resin beads to form a plastic article; and
   (d) ejecting said plastic article from said mold cavity.

3. In a method for forming a plastic article, the steps which include:
   (a) filling a mold cavity with expandable resin beads;
   (b) removing excess moisture from steam to be utilized in foamably expanding said resin beads by passage of the steam through a condensate collecting chamber located within the mold assembly;
   (c) introducing said steam from said chamber directly through a channel system into said mold cavity so as to foamably expand said resin beads to form a plastic article; and
   (d) introducing compressed air through said same channel system into said mold cavity so as to dry said channel system while ejecting said plastic article.

4. In a method for forming a plastic article, the steps which include:
   (a) filling a mold cavity with expandable resin beads;
   (b) removing excess moisture from steam at a point within the mold assembly proximate to the mold cavity into which it is introduced to foamably expand said resin beads; and
   (c) introducing said steam directly into said mold cavity through a channel system provided in the mold assembly so as to foamably expand said beads.

5. In a method for forming a plastic article, the steps which include:
   (a) filling a mold cavity with expandable resin beads;
   (b) removing excess moisture from steam at a point within the mold assembly proximate to the mold cavity into which it is introduced to foamably expand said resin beads;
   (c) introducing said steam directly into said mold cavity through a channel system provided in the mold assembly so as to foamably expand said beads; and
   (d) introducing compressed air through said channel system into said mold cavity so as to dry said channel system while ejecting said plastic article from said mold cavity.

References Cited

UNITED STATES PATENTS

| | | | |
|---|---|---|---|
| 2,744,291 | 5/1956 | Stastny et al. | 264—53 |
| 2,787,809 | 4/1957 | Stastny | 264—53 |
| 2,951,260 | 9/1960 | Harrison et al. | 264—53 XR |
| 3,129,464 | 4/1964 | Heider | 264—53 XR |

OTHER REFERENCES

Koppers booklet: "A New Foam Material . . . Dylite Expandable Polystyrene." © 1954, pp. 17–25.

ALEXANDER H. BRODMERKEL, *Primary Examiner.*

P. E. ANDERSON, *Assistant Examiner.*